(12) United States Patent
Hafenrichter et al.

(10) Patent No.: US 10,478,999 B2
(45) Date of Patent: Nov. 19, 2019

(54) THERMAL CURING OF CELL-BASED STRUCTURAL ARRAYS

(71) Applicant: The Boeing Company, Chicago, IL (US)

(72) Inventors: Joseph Lawrence Hafenrichter, Seattle, WA (US); Joseph A. Marshall, IV, Kent, WA (US)

(73) Assignee: The Boeing Company, Chicago, IL (US)

( * ) Notice: Subject to any disclaimer, the term of this patent is extended or adjusted under 35 U.S.C. 154(b) by 537 days.

(21) Appl. No.: 15/006,111

(22) Filed: Jan. 25, 2016

(65) Prior Publication Data

US 2016/0136849 A1 May 19, 2016

Related U.S. Application Data

(62) Division of application No. 13/896,012, filed on May 16, 2013, now Pat. No. 9,242,440.

(51) Int. Cl.
| | |
|---|---|
| *B29C 35/02* | (2006.01) |
| *B29D 24/00* | (2006.01) |
| *H01Q 21/00* | (2006.01) |
| *B32B 37/06* | (2006.01) |
| *H01Q 1/28* | (2006.01) |
| *B29L 31/60* | (2006.01) |
| *B29C 35/04* | (2006.01) |

(52) U.S. Cl.
CPC .......... *B29C 35/0266* (2013.01); *B29C 35/02* (2013.01); *B29D 24/005* (2013.01); *B32B 37/06* (2013.01); *H01Q 1/286* (2013.01); *H01Q 21/0087* (2013.01); *B29C 2035/046* (2013.01); *B29L 2031/60* (2013.01); *Y10T 156/10* (2015.01)

(58) Field of Classification Search
CPC ... B29C 51/00; F28F 2280/02; F28D 15/0275
USPC .......................................... 432/224
See application file for complete search history.

(56) References Cited

U.S. PATENT DOCUMENTS

| | | | |
|---|---|---|---|
| 2,185,692 A | 1/1940 | McCleary | |
| 3,130,450 A * | 4/1964 | Linhorst | ................. B29C 43/00 425/346 |
| 3,388,016 A | 6/1968 | Murray et al. | |
| 4,808,253 A | 2/1989 | Mimbs | |
| 4,820,564 A | 4/1989 | Cologna et al. | |

(Continued)

FOREIGN PATENT DOCUMENTS

EP 2704259 A2 3/2014

OTHER PUBLICATIONS

EP search report, dated Sep. 23, 2014, regarding application EP14167650.2, 7 pages.

(Continued)

*Primary Examiner* — Scott W Dodds
(74) *Attorney, Agent, or Firm* — Yee & Associates, P.C.

(57) ABSTRACT

Cells of a composite cell array are cured by placing tool blocks in the cells and inserting thermally conductive elements in each of the tool blocks. The thermally conductive elements are convectively heated by a flow of hot air. The heated conductive elements conduct heat to the tooling blocks, which then conduct heat to the cells to cure the composite and adhesive.

19 Claims, 9 Drawing Sheets

(56) References Cited

U.S. PATENT DOCUMENTS

| | | | | |
|---|---|---|---|---|
| 4,875,966 A | * | 10/1989 | Perko | B30B 15/06 156/580 |
| 4,878,826 A | * | 11/1989 | Wendt | B29C 51/04 264/322 |
| 4,916,880 A | | 4/1990 | Westerman, Jr. | |
| 4,978,404 A | | 12/1990 | Westerman, Jr. | |
| 4,987,700 A | | 1/1991 | Westerman, Jr. | |
| 5,184,141 A | | 2/1993 | Connolly et al. | |
| 5,207,541 A | | 5/1993 | Westerman, Jr. | |
| 5,279,725 A | | 1/1994 | Westerman, Jr. | |
| 5,773,540 A | * | 6/1998 | Irwin | B29C 51/04 425/387.1 |
| 7,046,209 B1 | | 5/2006 | McCarville et al. | |
| 7,109,942 B2 | | 9/2006 | McCarville et al. | |
| 7,935,205 B2 | | 5/2011 | Bogue et al. | |
| 8,446,330 B1 | | 5/2013 | McCarville et al. | |
| 2005/0029693 A1 | * | 2/2005 | Noda | B29C 44/08 264/46.9 |
| 2006/0097944 A1 | * | 5/2006 | McCarville | H01Q 1/286 343/795 |
| 2006/0097945 A1 | | 5/2006 | McCarville et al. | |
| 2008/0149240 A1 | | 6/2008 | Luneau et al. | |
| 2010/0250148 A1 | | 9/2010 | Meredith et al. | |
| 2012/0075805 A1 | * | 3/2012 | Cheng | H01L 23/427 361/700 |
| 2013/0229321 A1 | | 9/2013 | McCarville et al. | |

OTHER PUBLICATIONS

Armstrong et al., "Care and Repair of Advanced Composites" SAE International, 2nd ed., copyright 2005, 28 pages (representative copy) (ISBN 0-7680-1062-4).

Hafenrichter et al., "Reworking Array Structures," U.S. Appl. No. 13/623,607, filed Sep. 20, 2012, 53 pages.

Urcia et al., "Structurally Integrated Antenna Aperture Electronics Attachment Design and Methodology," U.S. Appl. No. 12/910,825, filed Oct. 24, 2010, 36 pages.

Hafenrichter et al., "Thermal Curing of Cell-Based Structural Arrays,"U.S. Appl. No. 13/896,012, filed May 16, 2013, 33 pages.

Notice of Allowance dated Aug. 15, 2014, U.S. Appl. No. 13/623,607, 11 pages.

* cited by examiner

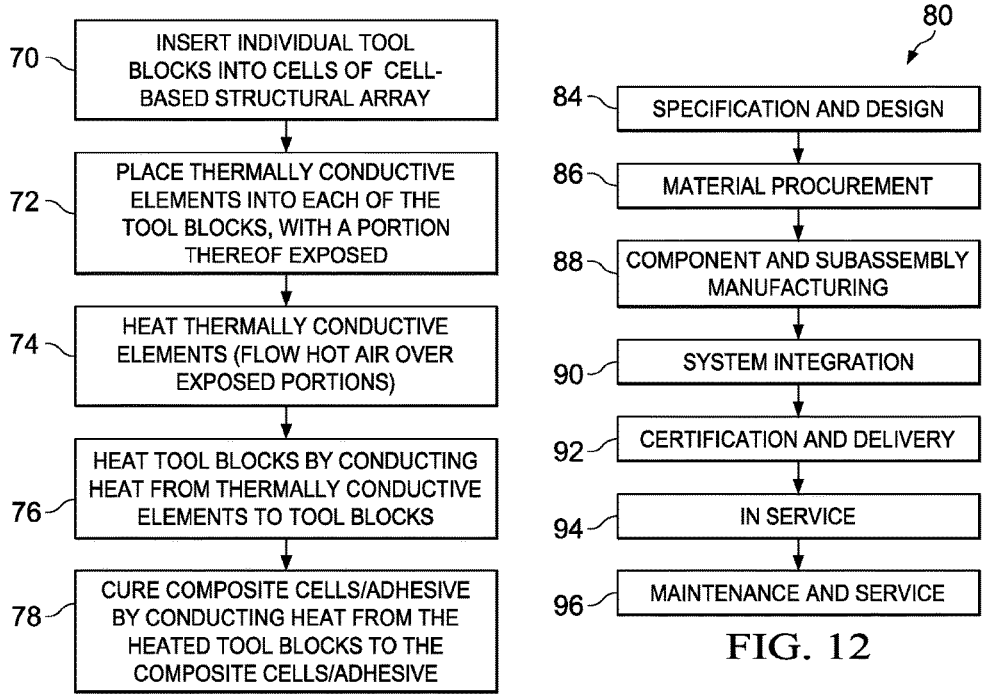
FIG. 11
FIG. 12
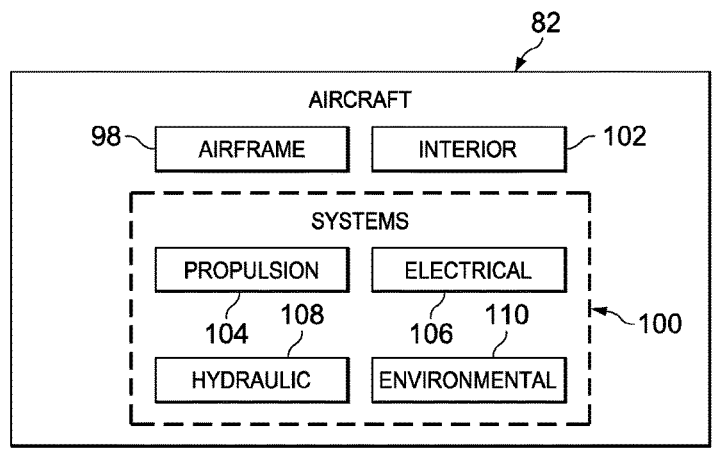
FIG. 13

THERMAL CURING OF CELL-BASED STRUCTURAL ARRAYS

This application is a divisional application of U.S. patent application Ser. No. 13/896,012, filed May 16, 2013.

BACKGROUND INFORMATION

1. Field

The present disclosure generally relates to manufacturing and reworking of adhesively bonded cell-based arrays, and deals more particularly with a method and apparatus curing the adhesive that bonds the cells and skin panels together.

2. Background

Cell-based structural arrays may be used to provide composite structures with strength and rigidity, and/or to form functional features such as a structural RF (radio frequency) aperture used for transmission and/or reception of RF signals. In one application, a cell-based structural array is bonded between inner and outer facesheets to form a sandwich structure. The cell-based structural array comprises individual hollow cells formed by cell walls that are adhesively joined together along bondlines. After the adhesive is applied, a bank of tooling blocks is inserted into the cells of the array, and the array along with the tooling blocks are placed in an oven or an autoclave for thermal curing.

The curing technique described above relies on convection heat sources which may not evenly convect heat across the bank of tooling blocks. This uneven convection heating is due in part to thermal gradients caused by the relatively high thermal mass of the tooling blocks. Uneven convection heating may result interior sections of the cell-based array heating up more slowly than the outer sections. Additionally, uneven heating may occur within the individual cells where the tooling blocks have insufficient thermal conductivity to conduct heat uniformly through the interior of the cells. Again, this non-uniform heat conduction, particularly in remote regions of the tooling blocks, is due to the relatively high thermal mass of the tooling blocks.

As a result of these causes of uneven cell heating, the bonding adhesive may not be cured with sufficient uniformity across all cells of the array to meet process specifications, resulting in scrap or rework which adds to manufacturing costs.

Accordingly, there is a need for a method and apparatus that provide consistent, uniform heating of adhesively bonded cell-based arrays during thermal curing. There is also a need for a method and apparatus of the type mentioned above that reduces the fabrication cost of composite sandwich structures, increases production yields and reduces the time required for thermal curing.

SUMMARY

The disclosed embodiments provide a high yield, low-cost method and apparatus for thermally curing adhesives used to fabricate or rework cell-based structural arrays, such as those employed for structural RF apertures. Consistent, uniform heating of adhesive bondlines in each cell of the array is achieved using a combination of convection and conduction heating. Warm air is convected evenly across a bank of tools placed in the cells, and the heated tools uniformly conduct heat into each cell to cure the adhesive. The tools are simple and easily fabricated. Improved, uniform curing provided by the disclosed embodiments reduce fabrication and rework costs, while increasing production yields and decreasing cure times. The embodiments are well suited for uniform heating of large area cell arrays. Equipment costs may be reduced through the use of fewer thermocouples needed for monitoring cure temperatures, and use of less costly and/or less precise cure ovens.

According to one disclosed embodiment, an apparatus is provided for thermally curing a composite structure having at least one cell therein. The apparatus comprises a tool block capable of being inserted into the cell, contacting the composite structure, and a thermally conductive element extending substantially through the tool block and having an exposed portion outside of the tool block, the thermally conductive element capable of being convectively heated by a flow of warm air passing over the exposed portion thereof. The thermally conductive element may have a thermal conductivity greater than a thermal conductivity of the tool block. The thermally conductive element may be a metal rod. The tool block has a depth, and the thermally conductive element is in contact with the tool block substantially throughout the depth of the tool block. The tool block may have a substantially polygonal cross-sectional shape, and the thermally conductive element may have a substantially circular cross-sectional shape. The thermally conductive element may be formed from at least one of steel, iron, aluminum, copper and carbon.

According to another disclosed embodiment, apparatus is provided for thermally curing a composite structure having an array of composite cells formed by cell walls joined together by an adhesive. The apparatus comprises a bank of thermally conductive tools, wherein each of the tools includes a tool block capable of being received into one of the cells for thermally curing the adhesive, and a thermally conductive element passing substantially through the tool block. The apparatus further comprises a thermally conductive element including an exposed portion extending beyond the tool block and capable of having hot air flow thereover for convectively heating the exposed portion. The thermally conductive element may have a thermal conductivity greater than a thermal conductivity of the tool block and may be formed of at least one of steel, iron, aluminum, and copper. The tooling block has a depth at least as great as a depth of the cell into which it is received, and the thermally conductive element is in surface-to-surface contact with the tool block substantially the entire depth of the tool block. The apparatus may further comprise a manifold for directing a flow of hot air across the exposed portion of the thermally conductive element. The manifold includes an enclosure capable of enclosing the array of composite cells, and at least one fan or other means for flowing hot air through the enclosure.

According to a further embodiment, a method is provided of curing adhesive used to bond together walls of cells forming a composite cell array. The method comprises inserting a plurality of tool blocks respectively into the cells of the composite cell array, placing a plurality of thermally conductive elements respectively into the tool blocks such that a portion of each of the thermally conductive elements is exposed, heating the thermally conductive elements, and heating the tool blocks to a cure temperature sufficient to cure the cell adhesive by conducting heat from the thermally conductive elements to the tooling blocks. Heating the thermally conductive elements is performed by convective heating achieved by passing hot air over the exposed portion of the thermally conductive elements. The convective heating may be performed by placing the cell array, the tool blocks, and the thermally conductive elements inside of a manifold, and flowing hot air through the manifold across the exposed portion of the thermally conductive elements.

According to another disclosed embodiment, a method is provided of heating a composite cell array, comprising inserting a plurality of tool blocks respectively into the cells of the composite cell array, and heating thermally conductive elements in each of the composite cells in the cell array. The tool blocks are heated by conducting heat from the thermally conductive elements to the tool blocks. Heating the thermally conductive elements may be performed by flowing hot air over exposed portions of the thermally conductive elements. Conducting heat from the thermally conductive elements to the tool blocks includes conducting heat from the exposed portions of the thermally conductive elements into the tool blocks. Heating the thermally conductive elements may be performed by inductive heating.

According to still another disclosed embodiment, a method is provided of substantially uniformly heating each of a plurality of cells forming a composite cell array. The method comprises locating a plurality of thermally conductive elements respectively within the plurality of cells, convectively heating the thermally conductive elements, and heating each of the cells by conducting heat from the thermally conductive elements to the cells. Convectively heating the thermally conductive elements is performed by flowing hot air over the thermally conductive elements. Locating the plurality of thermally conductive elements includes exposing a portion of each of the thermally conductive elements to the hot air flowing thereover. The method may further comprise placing a plurality of tool blocks respectively inside the cells. Locating the plurality of thermally conductive elements includes placing the thermally conductive elements respectively inside, and in contact with the tool blocks.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 11 is an illustration of a flow diagram of a method of thermally curing a cell-based structural array.

FIG. 12 is an illustration of a flow diagram of aircraft production and service methodology.

FIG. 13 is illustration of a block diagram of an aircraft.

DETAILED DESCRIPTION

Figure 1:
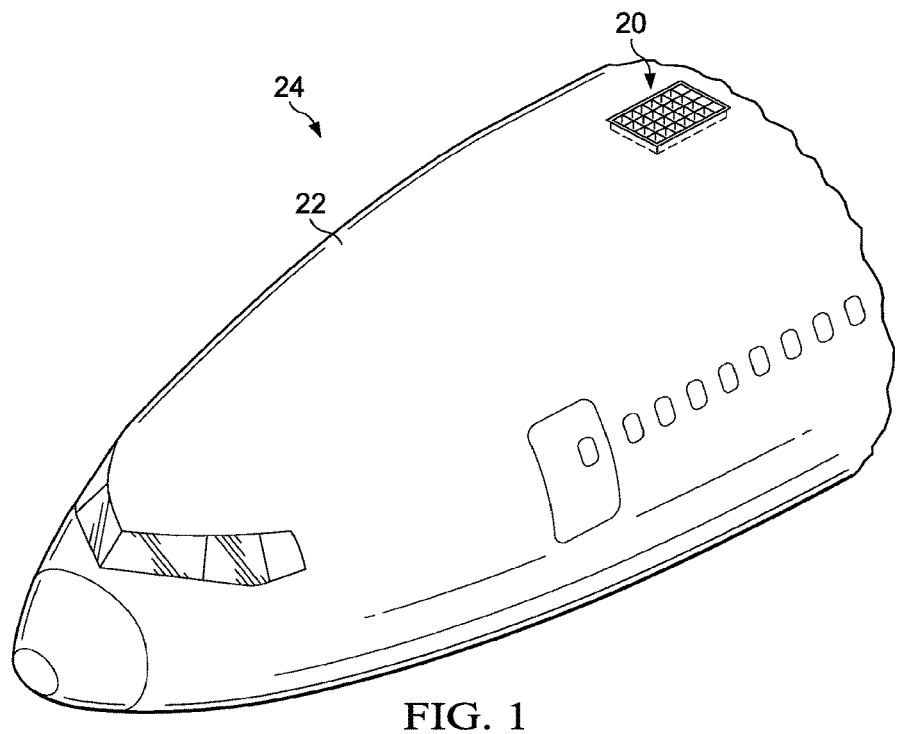
FIG. 1 is an illustration of a perspective view of a front portion of an aircraft fuselage.
Figure 2:
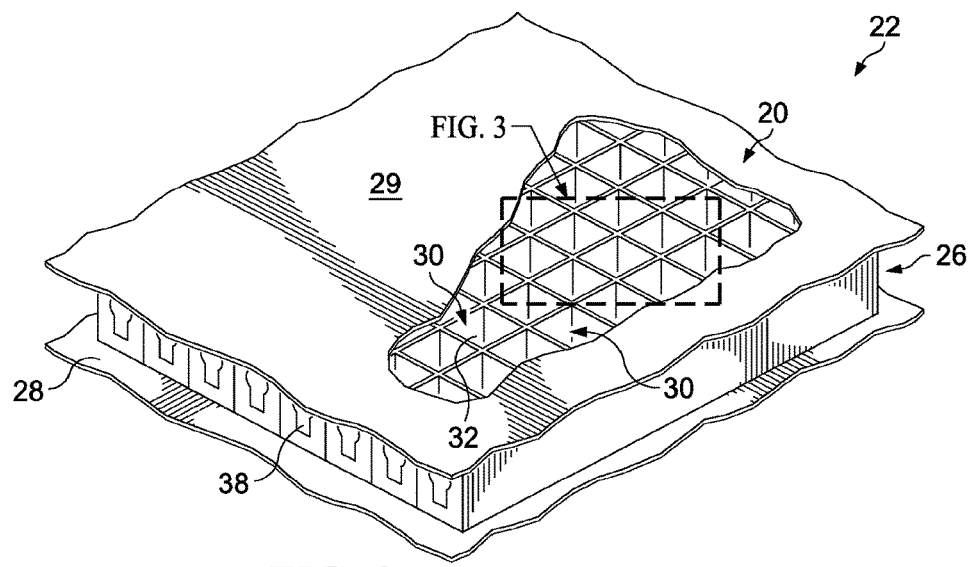
FIG. 2 is an illustration of a perspective view of a portion of an structural RF aperture shown in FIG. 1.

The disclosed embodiments may be employed to fabricate or rework composite structures that incorporate cell-based arrays, sometimes referred to herein as cell-based structural arrays. For example, referring to FIG. 1, a structural RF (radio frequency) aperture 20 used for communication may be integrated into the skin 22 of the aircraft fuselage 24. As shown in FIG. 2, the RF structural aperture 20 comprises an array 26 of cells 30 sandwiched between inner and outer facesheet 28, 29 to form a composite sandwich structure. Although the structural RF aperture 20 is shown as being located in the aircraft fuselage 24, it may be located in other areas of the aircraft, including but not limited to wings, cowls, stabilizers, doors, etc. Moreover, although an aircraft application is illustrated, the cell-based structural array may be incorporated into structures used in other applications, such as, for example and without limitation, land or sea vehicles satellites, etc.

Figure 3:
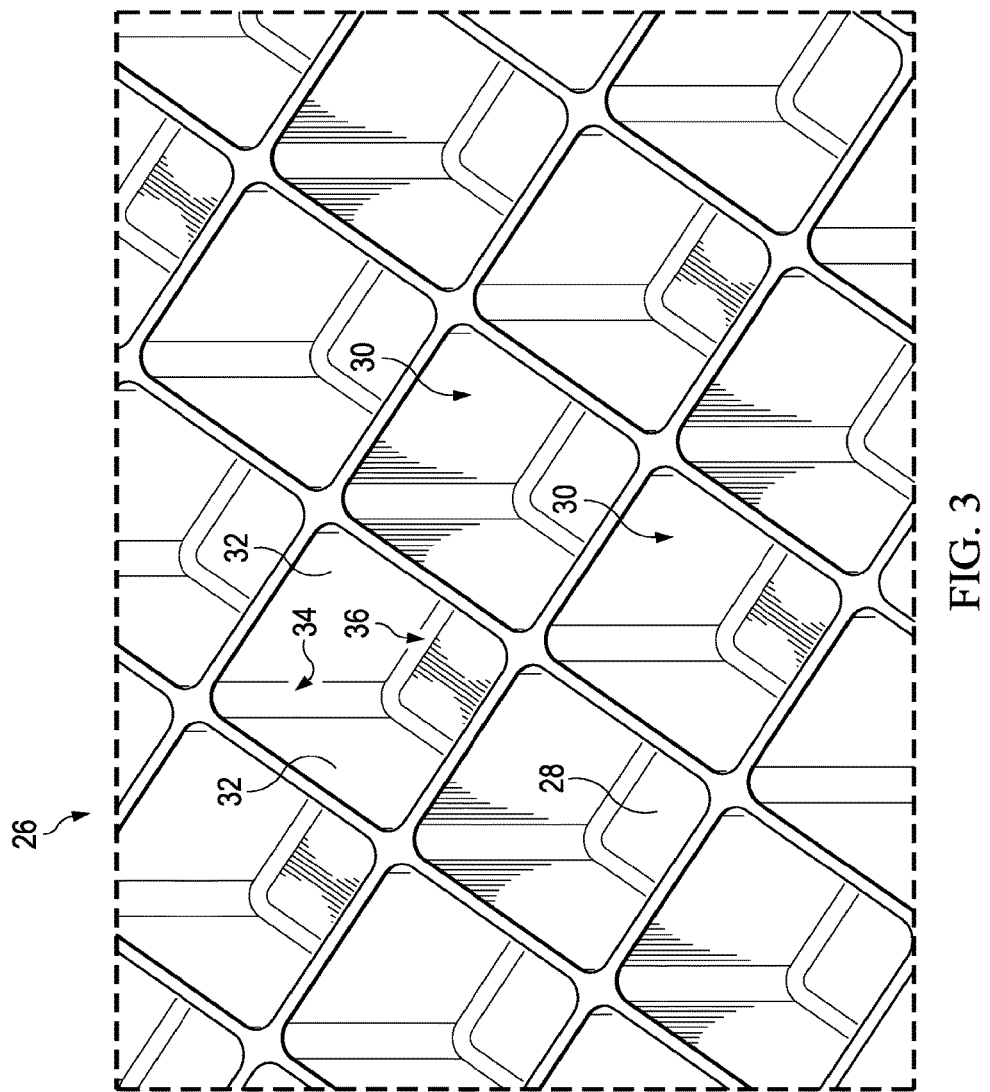
FIG. 3 is an illustration of a perspective view of the area designated as "FIG. 3" in FIG. 2.
Figure 4:
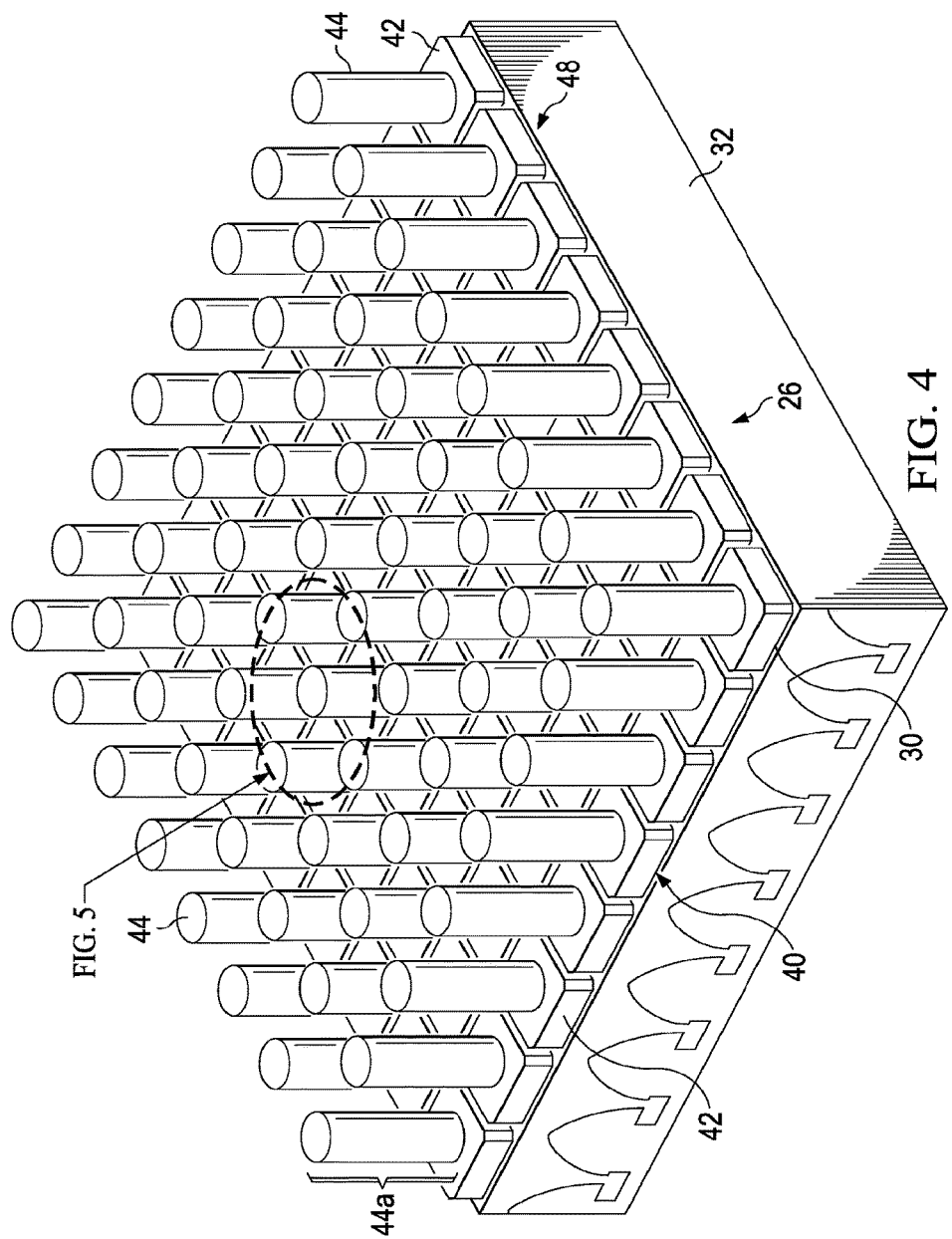
FIG. 4 is an illustration of a perspective view of a bank of tools inserted in a cell array.
Figure 5:
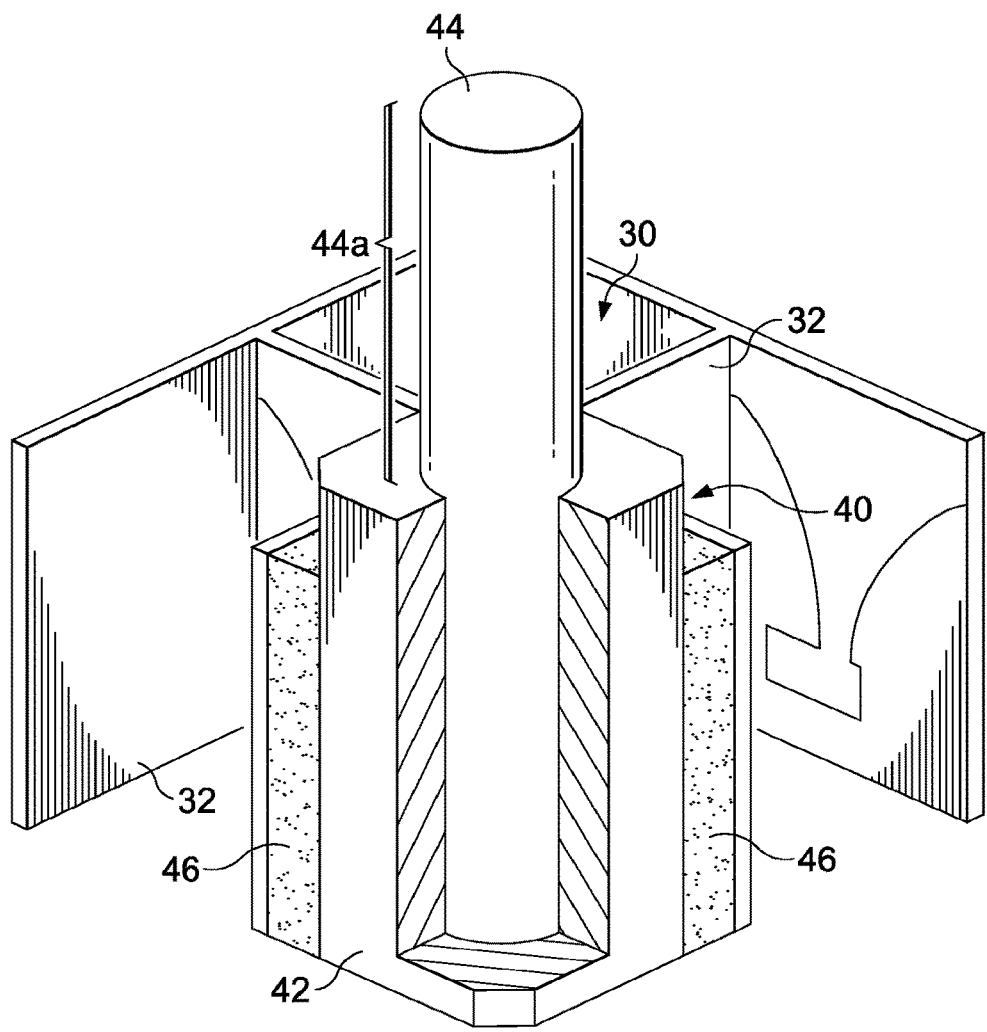
FIG. 5 is an illustration of a perspective view of one of the tools shown in FIG. 4, parts broken away in section.
Figure 6:
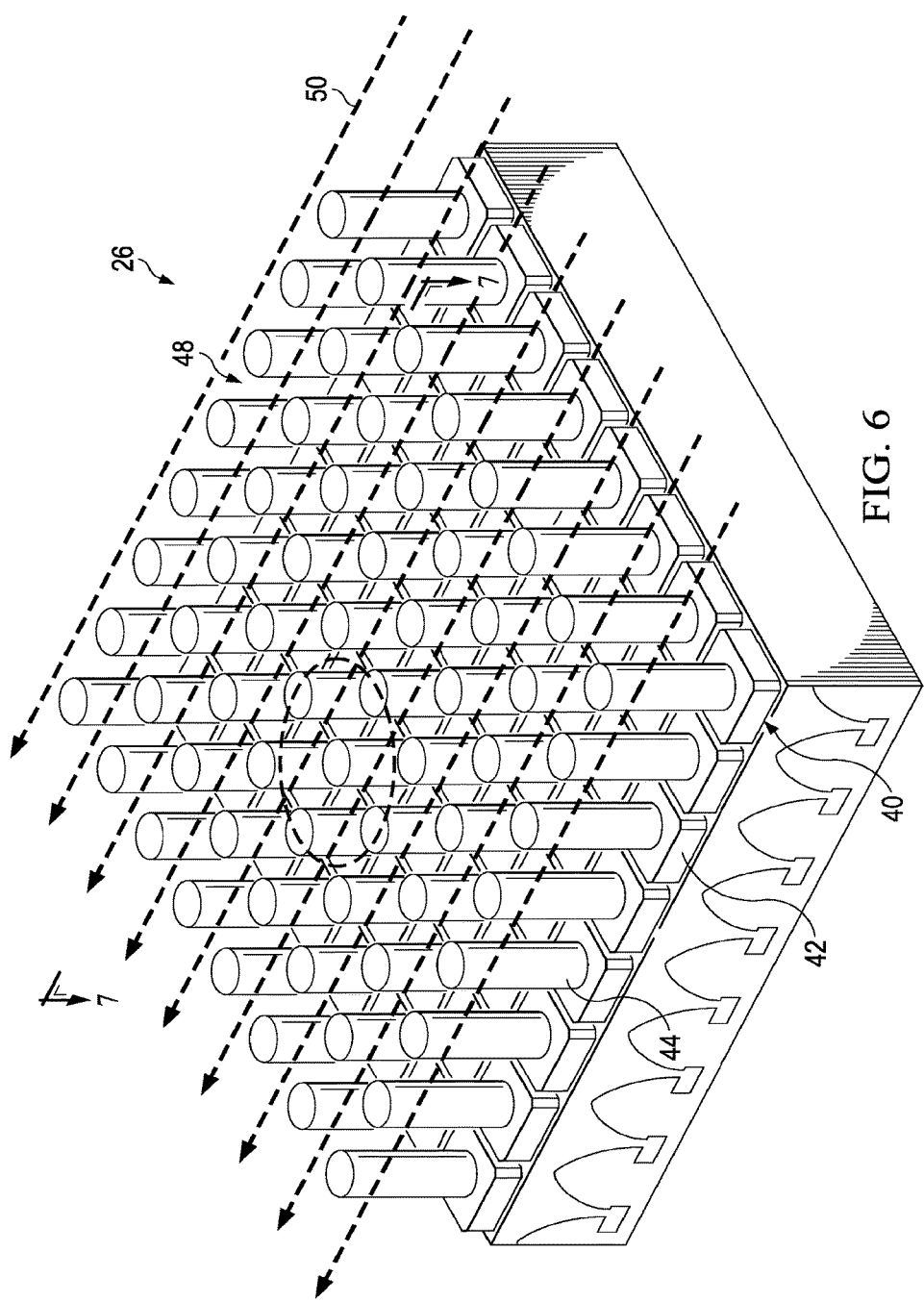
FIG. 6 illustration of a view similar to FIG. 4 but showing hot air convected across the bank of tools.
Figure 7:
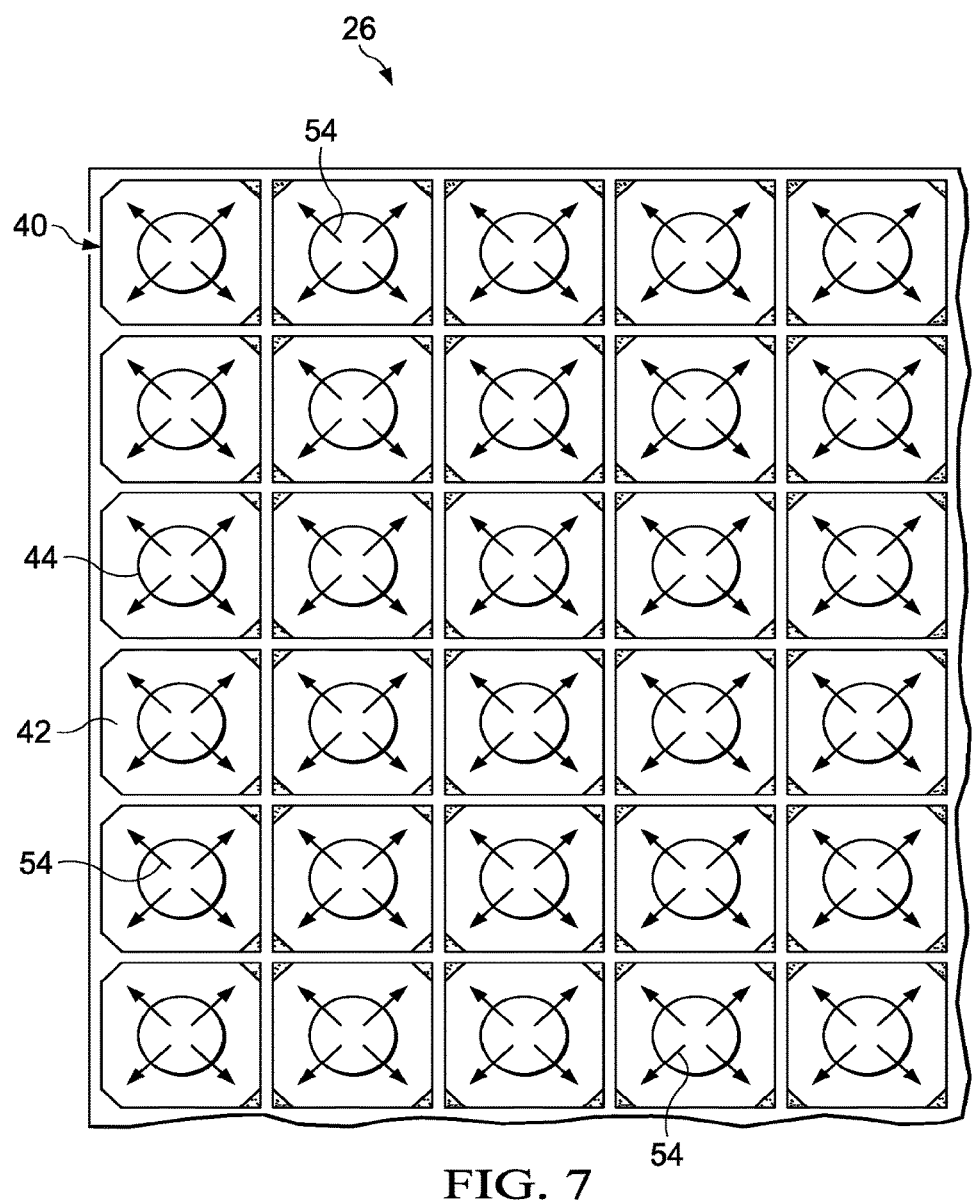
FIG. 7 is an illustration of a sectional view taken along the line 7-7 in FIG. 6.
Figure 9:
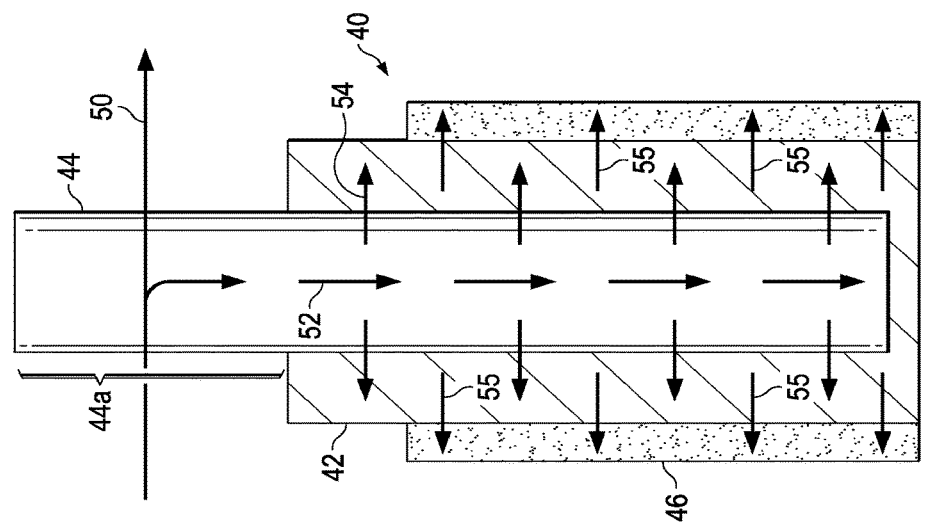
FIG. 9 is an illustration of a sectional view taken along the line 9-9 in FIG. 8.
Figure 8:
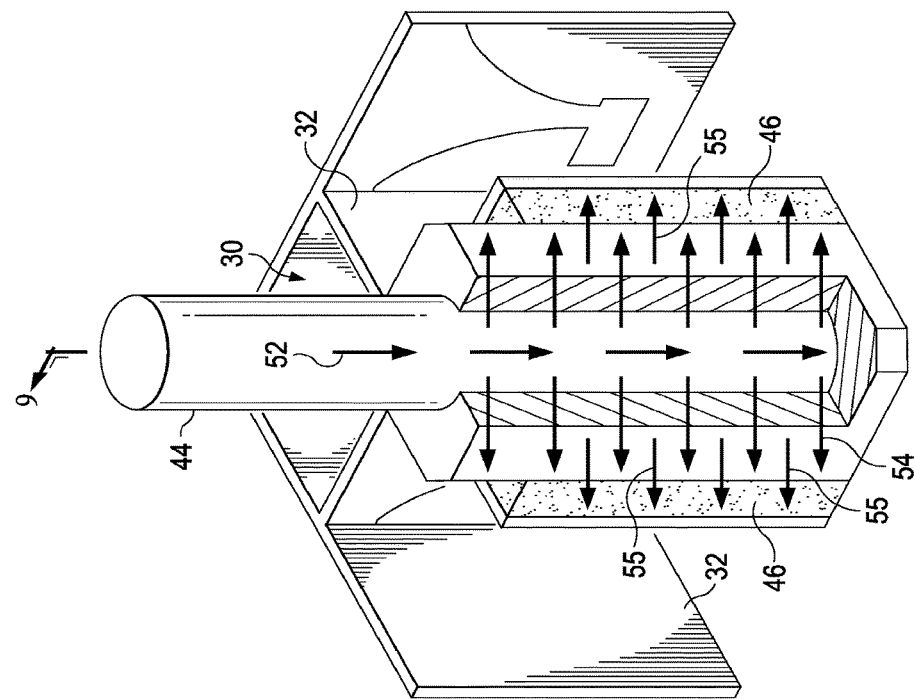
FIG. 8 is an illustration of a view similar to FIG. 5 but showing the conduction of heat through the thermal conductor and the tooling block.

Referring also to FIG. 3, the cells 30 are formed by walls 32 that are joined together along their mutual edges by a resin bonding adhesive 46 (see FIGS. 5, 8 and 9) forming vertical adhesive fillets or bondlines 34. The walls 32 are also joined to the inner facesheet 28 or to RF antenna elements 38 by bonding adhesive 46 forming horizontal adhesive fillets or bondlines 36. Each of the cells 30 may include an RF antenna element 38 adapted to receive and/or transmit RF communication signals. In the illustrated example, the cells 30 have a substantially rectangular cross-section, however other cross-sectional cell shapes are possible. The structural RF aperture 20 shown in FIGS. 1-3 is merely illustrative of a wide range of cell-based structural arrays that may be fabricated and/or reworked using the method and apparatus described below in greater detail.

During fabrication and/or rework of a cell-based structural array 26 it may be necessary to thermally cure the walls 32 and/or the bonding adhesive forming the fillets 34, 36. Referring now to FIGS. 4-9, the structural array 26 may be thermally cured using a bank 48 of tools 40, each of which is inserted into one of the cells 30. Each of the tools 40 includes a tool block 42 and a rod-like, generally centrally located thermally conductive element 44. The thermally conductive element 44 passes through, and is in face-to-face surface contact with the tool block 42, substantially along the entire depth of the tool block 42. Each of the tool blocks 42 and the thermally conductive elements 44 is formed of a thermally conductive material such as aluminum, steel, carbon, iron, copper or a metal alloy. In one embodiment, the thermally conductive element 44 may have a thermal conductivity however, that is greater than the thermal conductivity of the tool block 42. In other embodiments, however, the tool blocks 42 may have a relatively high conductivity and the thermally conductive elements 44 may be only moderately conductive with a conductivity that is less than that of the tool blocks 42.

Each of the tool blocks 42 has a cross-sectional shape substantially matching that of cells 30 and is in substantially face-to-face contact with the surrounding walls 32. More particularly, each of the tool blocks 42 is in contact with the bonding adhesive 46. The tool blocks 42 may be solid, but in some embodiments, the tool block 42 may include hollowed areas to house functional components (not shown). In still other embodiments, each of the tool blocks 42 and the thermally conductive elements 44 may have a circular cross-sectional shape. In another variation, the thermally conductive elements 44 may be hollow. The thermally conductive element 44 has an exposed portion 44a that extends beyond and above the tool block 42. In the illustrated embodiment, each of the thermally conductive elements 44 is generally cylindrical with a generally circular cross-section, however other cross-sectional geometries are possible. Although not shown in the drawings, the thermally conductive element 44 may include surface fins to increase its ability to absorb thermal energy from a convective flow 50 of fluid such as, for example and without limitation, a flow of hot air (hereinafter referred to as a hot airflow 50) that is passed over the bank 48 of tools 40. It may be possible to heat the thermally conductive elements 44 using other heating techniques, such as, without limitation, induction heating.

The thermally conductive elements 44 may be installed within each of the tool blocks 42 by any suitable means, including but not limited to friction fit insertion or swaging. Regardless of the installation method used, the thermally conductive elements 44 are installed such that the tool blocks 42 are in intimate surface contact with each other. This intimate surface contact maximizes the conduction of thermal energy from the thermally conductive elements 44 to the tool blocks 42. The exposed portions 44a of the thermally conductive elements 44 may be substantially equal in length and may extend beyond the tool blocks 42 a distance that presents a desired surface area to convective hot airflow 50. The convective hot airflow 50 convectively heats the thermally conductive elements 44. In the illustrated embodiment, the tools 40 in the bank 48 are arranged in aligned rows and columns, corresponding to the layout of the cells 30 in the array 26, however other aligned or non-aligned arrangements are possible.

In use, after the cell array 26 has been assembled and the bonding adhesive has been applied, one of the tools 40 is inserted into each of the cells 30. The thermally conductive elements 44 may be inserted into the tool blocks 42 either before or after the tool blocks 42 have been placed in the cells 30. The cell array 26 along with the bank 48 of tools 40 is placed in an oven (not shown) or other suitable heated chamber, where hot air 50 is flowed across the tool bank 48. The convective hot airflow convectively heats the exposed portions 44a of the thermally conductive elements 44. The heat is conducted downwardly 52 through the thermally conductive elements 44 and is conducted radially 54 outward into the tool blocks 42. The tool blocks 42 in turn conduct the heat 55 to the surrounding adhesive 46 and cell walls 32. Because substantially the same volume of hot airflow 50 passes across all of the thermally conductive elements 44, regardless of the position of the tool 40 in the tool bank 48, substantially the same amount of heat is delivered to the adhesive 46 in all of the cells of the cell array 26. As a result of the same amount of heat being delivered to all of the cells 30, all of the cells 30 are heated at the same rate. This even heating of the cells 30 may reduce cure cycle times, while reducing or eliminating variations in curing from cell-to-cell.

Figure 10:
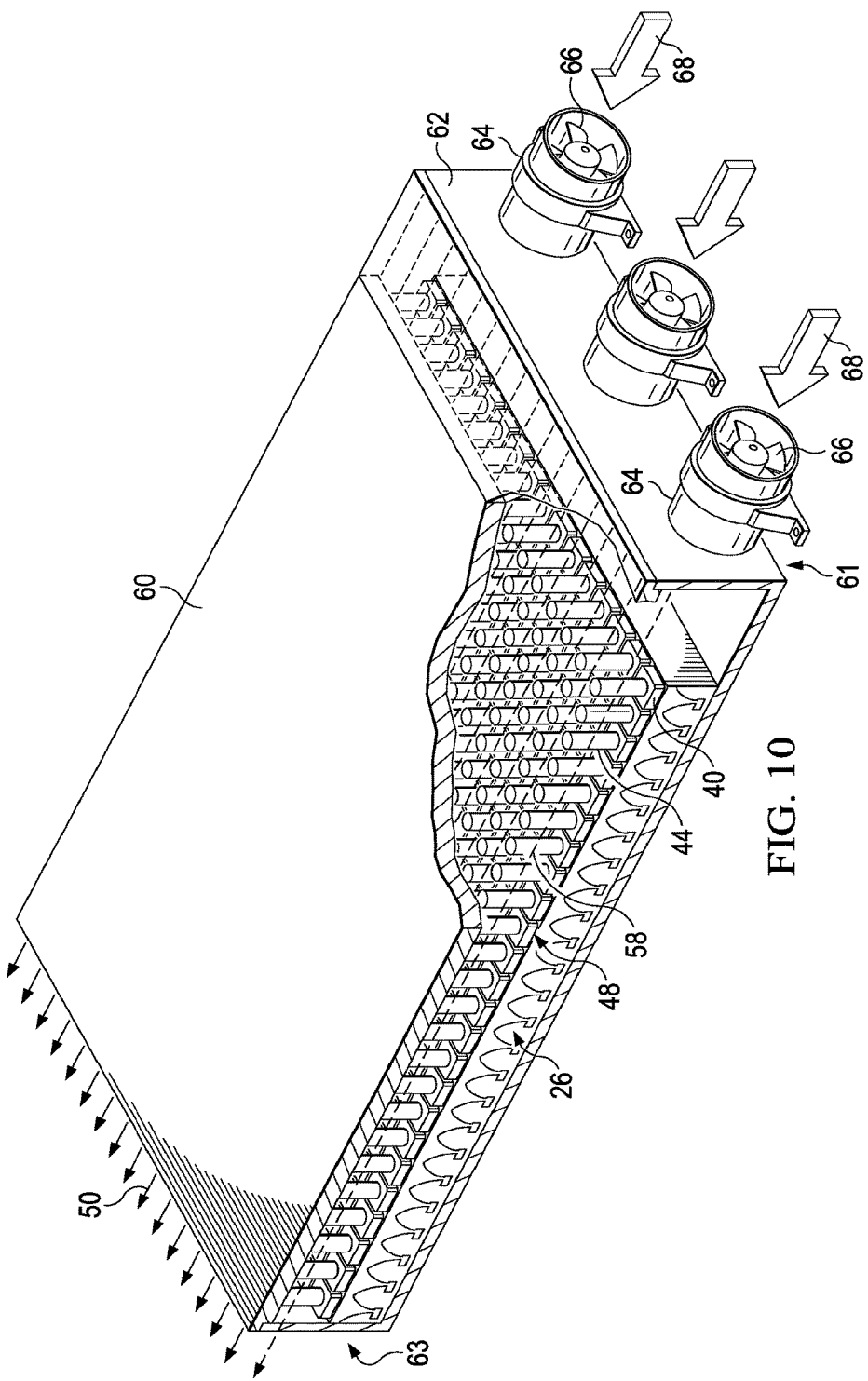
FIG. 10 is an illustration of a perspective view of the cell array and bank of tools having been placed inside a manifold.

Attention is now directed to FIG. 10 which illustrates a manifold 62 that may be used in combination with the bank 48 (FIG. 6) to achieve even, efficient and rapid thermal curing of a cell array 26. The manifold 62 comprises an enclosure 60 into which the cell array 26 may be placed for curing. Tubular inlets 64 in one end 61 of the enclosure 60 are each provided with fans 66 that draw hot air 68 into the enclosure 60, and evenly distribute the air across the tool bank 48. The hot airflow 50 convectively heats the exposed portions 44a of the thermally conductive elements 44, and exits the enclosure 60 at the opposite end 63. The flow rate of hot air passing over the exposed portions 44a may be controlled by controlling the speed of the fans 66. Although not shown in the figures, a heat source such as electrical heating coils may be integrated into the enclosure 60 in order to heat the air as it is being introduced into the enclosure 60. In other embodiments, the manifold 62 may be placed in an oven or an autoclave which supply the heat necessary for curing. A wide variety of other techniques may be employed to produce the desired hot airflow 50 across the thermally conductive elements 44. For example, although not shown in the drawings, in an alternate embodiment, the enclosure 60 may be provided with a funnel-like or horn shaped structure that focuses ambient airflow occurring within a cure oven into an inlet opening of the enclosure 60, and across the tool bank. In still another embodiment, the fans 66 may be placed at the outlet 63 of the enclosure and configured to draw air through the manifold 60, rather than push it.

FIG. 11 broadly illustrates a method of substantially uniformly heating the cells of a structural cell array 26 using the apparatus previously described. Beginning at 70, individual tool blocks 42 are inserted into each of the cells 30 of the cell-based structural array 26. At step 72, thermally conductive elements 44 are placed into each of the tool blocks 42, with a portion 44a thereof exposed. At 74, the conductive elements 44 are thermally heated, as by flowing hot air 50 over the exposed portions 44a of the thermally conductive elements 44, or by using other heating techniques. At step 76, the tool blocks 42 are heated by conducting heat from the thermally conductive elements 44 to the tool blocks 42. At 78, the composite cells and adhesive are cured by conducting heat from the heated tool blocks 42 to the composite cells/adhesive.

Embodiments of the disclosure may find use in a variety of potential applications, particularly in the transportation industry, including for example, aerospace, marine, automotive applications and other application where cell-based structural components are employed. Thus, referring now to FIGS. 12 and 13, embodiments of the disclosure may be used in the context of an aircraft manufacturing and service method 80 as shown in FIG. 12 and an aircraft 82 as shown in FIG. 13. Aircraft applications of the disclosed embodiments may include, for example, without limitation, composite cell cores used in composite sandwich structures, and RF apertures, to name only a few. During pre-production, exemplary method 80 may include specification and design 84 of the aircraft 82 and material procurement 86. During production, component and subassembly manufacturing 88 and system integration 90 of the aircraft 82 takes place. Thereafter, the aircraft 82 may go through certification and delivery 92 in order to be placed in service 94. While in service by a customer, the aircraft 82 is scheduled for routine maintenance and service 96, which may also include modification, reconfiguration, refurbishment, and so on.

Each of the processes of method 80 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 82 produced by exemplary method 80 may include an airframe 98 with a plurality of systems 100 and an interior 102. Examples of high-level systems 100 include one or more of a propulsion system 104, an electrical system 106, a hydraulic system 108, and an environmental system 110. Any number of other systems may be included. Although an aerospace example is shown, the principles of the disclosure may be applied to other industries, such as the marine and automotive industries.

Systems and methods embodied herein may be employed during any one or more of the stages of the production and service method 80. For example, components or subassemblies corresponding to production process 88 may be fabricated or manufactured in a manner similar to components or subassemblies produced while the aircraft 82 is in service. Also, one or more apparatus embodiments, method embodiments, or a combination thereof may be utilized during the production stages 88 and 90, for example, by substantially expediting assembly of or reducing the cost of an aircraft 82. Similarly, one or more of apparatus embodiments, method embodiments, or a combination thereof may be utilized while the aircraft 82 is in service, for example and without limitation, to maintenance and service 96.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus configured to simultaneously thermally cure a plurality of adhesive fillets that join walls and a composite facesheet together to form an array that comprises a number of cells, such that the apparatus comprises:
   a bank that comprises a number of tool blocks equal to the number of cells, each tool block in the number of tool blocks configured to be inserted into a single cell in the array, respectively, such that each tool block, respectively, comprises a shape that contacts each wall of the single cell and comprises a plurality of chamfered corners, with each chamfered corner, of the plurality of chamfered corners, respectively configured to:
      remain separate from contact with an interior corner of the single cell;
      form a gap between the each tool block and interior corner;
      contact an uncured fillet, of the plurality of adhesive fillets, that fills the gap;
      simultaneously deliver a same amount of heat to the uncured fillet as an amount of heat delivered to each uncured fillet in every interior corner of every cell in the array; and
      simultaneously cure each uncured fillet in every interior corner of every cell in the array; and
   a thermally conductive element, which extends substantially through each tool block, and such that thermally conductive element comprises an exposed portion that extends outside of the each tool block, the thermally conductive element configured to: convectively receive heat from a flow of warm air over the exposed portion, and conductively uniformly heat each exterior surface of each tool block in contact with, respectively, each uncured fillet in the single cell.

2. The apparatus of claim 1, wherein the thermally conductive element has a thermal conductivity greater than a thermal conductivity of the tool block.

3. The apparatus of claim 1, wherein the thermally conductive element has a thermal conductivity less than a thermal conductivity of the tool block.

4. The apparatus of claim 1, wherein the uncured fillet comprises a resin bonding adhesive, and the thermally conductive element comprises metal and carbon.

5. The apparatus of claim 1, wherein:
   the tool block comprises a substantially polygonal cross-sectional shape; and
   the thermally conductive element comprises a substantially circular cross-sectional shape.

6. The apparatus of claim 1, wherein the thermally conductive element comprises at least one of: steel, iron, aluminum, carbon and copper.

7. An apparatus configured to rework and thermally cure a composite structure that comprises an array of cells formed by composite cell walls joined together by an adhesive, such that the apparatus comprises:
   a bank of tools, such that each of the tools comprises, respectively: a thermally conductive material;
      a tool block configured to be received into one of the cells such that the tool block comprises a shape that contacts each wall of the one of the cells and comprises a plurality of chamfered corners, with each chamfered corner, of the number of chamfered corners, respectively configured to:
   remain separate from contact with an interior corner of the one of the cells; form
   a gap between the tool block and the interior corner;
   contact an uncured fillet that fills the gap;
      deliver a same amount of heat to the uncured fillet as an amount of heat delivered to each uncured fillet in every interior corner of every cell in the array; and
      simultaneously conduct a heat, uniformly to each uncured fillet in every interior corner, that cures the adhesive; and
   a thermally conductive element configured to pass substantially through the tool block such that an exterior of the thermally conductive element directly contacts an interior of the tool block, and such that the thermally conductive element comprises an exposed portion configured to extend beyond the tool block and receive hot air flow that convectively heats the exposed portion, and conductively evenly heats each exterior surface of the tool block in contact with, respectively, each uncured fillet in one of the cells.

8. The apparatus of claim 7, wherein the thermally conductive element has a thermal conductivity greater than a thermal conductivity of the tool block.

9. The apparatus of claim 7, wherein the thermally conductive element has a thermal conductivity less than a thermal conductivity of the tool block.

10. The apparatus of claim 7, wherein the thermally conductive element is formed of at least one of steel, iron, aluminum, carbon and copper.

11. The apparatus of claim 7, wherein:
the tool block has a depth at least as great as a depth of the cell into which it is received; and
the thermally conductive element is in surface-to-surface contact with the tool block substantially an entire depth of the tool block.

12. The apparatus of claim 7, further comprising:
a manifold for directing a flow of hot air across the exposed portion of the thermally conductive element.

13. The apparatus of claim 12, wherein the manifold includes:
an enclosure capable of enclosing the array; and
at least one fan for flowing hot air through the enclosure.

14. A process for simultaneously curing adhesive fillets bonding an array of cells, the process comprising;
aligning walls to form an array of cells, such that each cell in the array of cells comprises a number of interior corners;
inserting a bank comprising a number of tool blocks into the array of cells, each tool block in the number of tool blocks, comprising respectively, an exterior surface configured to contact each interior surface of each cell and a plurality of chamfered corners, such that each chamfered corner in the plurality of chamfered corners, respectively, leaves a gap between the exterior surface of the tool block and an interior corner of the number of interior corners;
filling the gap with an adhesive fillet, of the adhesive fillets, that contacts each chamfered corner;
contacting, respectively, an interior surface of each tool block with a thermally conductive element comprising a portion extending out of the interior of the tool block;
flowing a heated fluid across the portion of the thermally conductive element; and
simultaneously, at every cell in the array, evenly heating and curing every adhesive fillet in the array of cells via evenly heating the exterior surface of each tool block, respectively, contacting the adhesive fillet, via conductively heating an interior surface of each tool block via convectively heating the portion via the heated fluid flowing across the portion.

15. The process of claim 14, further comprising the heated fluid consisting of air.

16. The process of claim 14, further comprising the adhesive fillet comprising a resin bonding adhesive.

17. The process of claim 16, further comprising the exterior surface of the tool block comprising a shape for evenly heating and curing each wall in the walls forming the array of cells.

18. The process of claim 14, further comprising the thermally conductive element comprising a circular cross-sectional shape.

19. The process of claim 14, further comprising:
each tool block comprising, respectively, a depth at least as great as a depth of the cell; and
the thermally conductive element contacting the interior surface of each tool block for substantially an entire depth of each tool block.

* * * * *